J. T. HORTON & T. E. McAVOY.
DERRICK.
APPLICATION FILED OCT. 20, 1910.
1,116,427.
Patented Nov. 10, 1914.
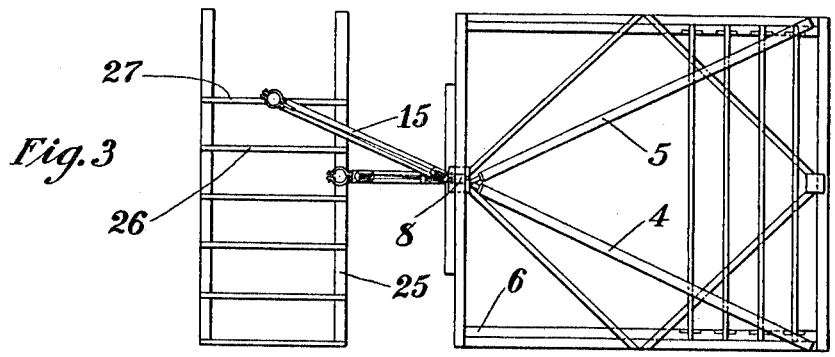
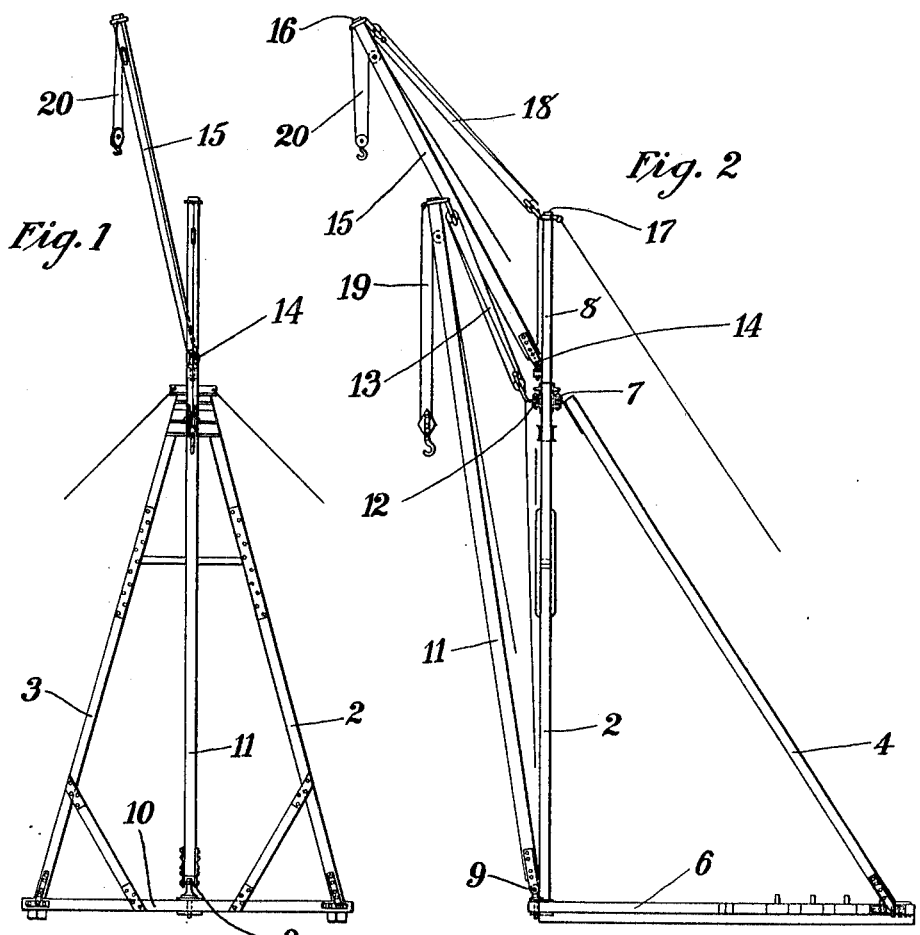
Witnesses:
Louis B. Fischler
Chas. W. La Rue
Inventors:
John T. Horton
Thomas E. McAvoy
by Wilbur M. Stone
Attorney

UNITED STATES PATENT OFFICE.

JOHN T. HORTON AND THOMAS E. McAVOY, OF NEW YORK, N. Y.

DERRICK.

1,116,427.  Specification of Letters Patent.  Patented Nov. 10, 1914.

Application filed October 20, 1910. Serial No. 588,101.

*To all whom it may concern:*

Be it known that we, JOHN T. HORTON and THOMAS E. McAVOY, citizens of the United States, and residents of New York, said HORTON in the county of Kings and said McAVOY in the county of New York, State of New York, have invented certain new and useful Improvements in Derricks, of which the following is a specification.

This invention relates to derricks and has for its object to provide a derrick having a plurality of independently operable load handling means preferably two and with one arranged above the other. With these objects in view the preferred form of our improvements is illustrated in the drawings accompanying this specification in which—

Figure 1 is a front elevation of our apparatus, Fig. 2 is a side elevation thereof and Fig. 3 is a plan thereof.

Our derrick comprises a vertical support preferably an A frame having members 2, 3 and rear struts 4, 5 all mounted upon and removably secured to a rectangular base frame 6. Said frame members and struts may be pivotally secured to each other respectively by means of hinge like members as 7, for convenience of assembling and disassembling. Secured to and extending upwardly from the point of jointure of members 2, 3 of said A frame we preferably erect mast 8 comprising the upper part of our vertical support. Pivoted at lower end 9 thereof in the lower part of said vertical support, preferably in cross beam 10 of base frame 6 is lower boom 11. The upper end of said boom 11 is connected with the vertical support at the point of jointure 12 of members 2, 3 by means of the usual tackle 13 for raising and lowering said boom in such way as is well known in the art. Just above the point of connection 12 of tackle 13, a second and upper boom 15 is pivotally supported at 14 near the foot of mast 8 of the vertical support. Said upper boom 15 is connected at its upper end 16 with the upper end 17 of the vertical support by means of tackle 18 entirely independent of boom 11 and tackle 13 thereof. Each of booms 11, 15 are provided with the usual independent hoisting tackle, as 19 to lower boom 11 and 20 to upper boom 15.

By the arrangement described we are able to independently handle with one unitary structure two separate and distinct loads at one and the same time.

Our improved apparatus is particularly efficient in the construction of, for instance, steel buildings where in many instances it is desirable to hold a major structural member as 25 in suspension so that it may be more or less shifted for the reception of one or more minor members as 26. 27.

Other applications of our improved apparatus to situations beyond the scope of any single boom derrick will be apparent to those skilled in the art.

We claim:—

1. A derrick including in combination, an upright, an upper boom pivoted to said upright, tackle for said boom connected to said upright above the pivotal point of said boom, a lower boom pivoted to said upright directly below the pivotal point of said upper boom, and tackle for said lower boom connected to said upright above the pivotal point of said lower boom and below the pivotal point of the upper boom.

2. A derrick including in combination, an upright and two booms, the booms being pivotally connected to said upright one above the other, and tackle connecting said booms respectively with said upright, said tackle being so arranged as to permit the load of one boom to be swung horizontally about said upright in vertical alinement with the load of the other boom without fouling the load of said other boom.

Signed at New York N. Y., U. S. A., this 19th day of October, 1910, before two subscribing witnesses.

JOHN T. HORTON.
THOMAS E. McAVOY.

Witnesses:
  WILBUR M. STONE,
  CHAS. W. LA RUE.

Copies of this patent may be obtained for five cents each, by addressing the "Commissioner of Patents, Washington, D. C."